United States Patent [19]

Hase et al.

[11] Patent Number: 4,810,416

[45] Date of Patent: Mar. 7, 1989

[54] BORATE PHOSPHOR

[75] Inventors: Takashi Hase, Ebina; Toshio Jinnai; Shigeo Fujino, both of Hiratsuka; Masato Hayashi, Odawara; Akio Toshinai, Ninomiya, all of Japan

[73] Assignee: Kasei Optonix, Ltd., Japan

[21] Appl. No.: 542,714

[22] Filed: Oct. 17, 1983

Related U.S. Application Data

[63] Continuation of Ser. No. 419,809, Sep. 20, 1982, abandoned, which is a continuation of Ser. No. 174,917, Aug. 4, 1980, abandoned.

[30] Foreign Application Priority Data

Aug. 3, 1979 [JP] Japan .............................. 54-99316
Sep. 19, 1979 [JP] Japan ............................. 54-119256

[51] Int. Cl.$^4$ .............................................. C09K 11/63
[52] U.S. Cl. ...................... 252/301.6 R; 252/301.4 R
[58] Field of Search ................. 252/301.4 R, 301.4 P, 252/301.6 R, 301.6 P

[56] References Cited

U.S. PATENT DOCUMENTS

| | | | |
|---|---|---|---|
| 3,014,877 | 12/1961 | Ranby et al. | 252/301.4 R |
| 3,375,465 | 3/1968 | Brixner | 252/301.6 R |
| 3,423,325 | 1/1969 | Wanmaker et al. | 252/301.4 R |
| 3,505,242 | 4/1970 | Chenot et al. | 252/301.6 R |
| 3,838,060 | 9/1974 | Kaduk | 252/301.4 R X |

FOREIGN PATENT DOCUMENTS

| | | | |
|---|---|---|---|
| 47-13483 | 4/1972 | Japan | 252/301.6 R |
| 54-112791 | 9/1979 | Japan | 252/301.4 P |
| 1044700 | 10/1966 | United Kingdom | 252/301.4 R |

OTHER PUBLICATIONS

Blasse et al I, "The J. of Chem. Phys.", vol. 51, No. 8, Oct. 1969, pp. 3252-3254.
Blasse et al II, "The J. of Chem. Phys.", vol. 47, No. 6, Sep. 1967, pp. 1920-1926.
Blasse et al III, "The J. of Chem. Phys.", vol. 47, No. 12, Dec. 1967, pp. 5139-5145.

Primary Examiner—Jack Cooper
Attorney, Agent, or Firm—Gerald J. Ferguson, Jr.

[57] ABSTRACT

A borate phosphor represented by the formula $a(M^{II}_{1-x}, M^{IV}_{x/2})O \cdot bM^V_2O_5 \cdot cM^I_2O \cdot (B_{1-y-z}, M^{III}_y, M^{VI}_{z/2})_2O_3:dCe,eTb$ wherein $M^{II}$ is at least one divalent metal selected from the group consisting of Mg, Be, Zn, Cd, Ca, Sr and Ba; $M^{IV}$ is at least one tetravalent element selected from the group consisting of Si, Ti, Ge, Zr, Sn, Th and Pb; $M^V$ is at least one pentavalent element selected from the group consisting of P, V, Nb, Sb, Ta and As; $M^I$ is at least one alkali metal selected from the group consisting of Li, Na, K, Rb and Cs; $M^{III}$ is at least one trivalent metal selected from the group consisting of Al, Sc, Ga, Y, In, La, Lu, Gd, Bi and Tl; $M^{VI}$ is at least one hexavalent metal selected from the group consisting of Mo, Te and W; and a, b, c, d, e, x, y and z are numbers satisfying the conditions of $0 < a \leq 2.0$; $0 \leq b \leq 0.3$; $0 \leq c \leq 0.3$; $0 < d \leq 0.6$; $0 \leq e \leq 0.6$, $0 \leq x \leq 0.6$, $0 \leq y \leq 0.35$ and $0 \leq z \leq 0.01$, respectively. The phosphor emits blue to green light of high luminance under excitation of ultraviolet rays, cathode rays, X-rays, vacuum ultraviolet rays, or the like. Particularly, the phosphor emits blue to green light of higher luminance than the conventional cerium activated or cerium and terbium activated oxide phosphors under excitation of ultraviolet rays or vacuum ultraviolet rays.

3 Claims, 2 Drawing Sheets

BORATE PHOSPHOR

This is a continuation of application Ser. No. 419,809, filed 9/20/82, which in turn is a continuation of application Ser. No. 174,917 filed 8/4/80 both now abandoned.

BACKGROUND OF THE INVENTION

1. Field of the Invention

This invention relates to a novel phosphor, and more particularly to a cerium activated or cerium and terbium activated borate phosphor which emits blue to green light of high luminance.

2. Description of the Prior Art

As a cerium activated or cerium and terbium activated oxide phosphor, have been known in the art a cerium activated magnesium aluminate phosphor ($CeMgAl_{11}O_{19}$, see Japanese Patent Public Disclosure No. 22,836/1977), a cerium and terbium activated magnesium aluminate phosphor [$(Ce,Tb)MgAl_{11}O_{19}$, see the above Japanese Patent Public Disclosure No. 22,836/1977], a cerium activated yttrium silicate phosphor ($Y_2SiO_5$: Ce, see Japanese Patent Public Disclosure No. 37,914/1973), a cerium and terbim activated yttrium silicate phosphor ($Y_2SiO_5$:Ce,Tb, see Japanese Patent Laid Open No. 127,384/1978), a cerium activated calcium phosphate phosphor [$Ca_3Ce(PO_4)_3$, see Japanese Patent Laid Open No. 57,480/1979], a cerium and terbium activated calcium phosphate phosphor [$Ca_3(Ce,Tb)(PO_4)_3$, see the above Japanese Patent Laid Open No. 57,480/1979], a cerium and terbium activated boron oxide phosphor [$(Ce,Tb)_2O_3 \cdot 3B_2O_3$, see Japanese Patent Laid Open No. 33,986/1978], etc. Generally, these cerium and terbium activated oxide phosphors emit blue to green light. That is, among these phosphors, the phosphor activated with cerium solely exhibits blue light emission caused by cerium. On the other hand, in the phosphor activated with both cerium and terbium, as the amount of terbium relative to the amount of cerium increases, the energy transmitted from cerium to terbium increases and therefore, the green light emission caused by terbium is gradually enhanced. When the amount of terbium relative to the amount of cerium is larger than a certain value, the phosphor exhibits grcen light emission.

The above-mentioned conventional cerium activated or cerium and terbium activated oxide phosphors emit blue to green light of considerably high luminance under excitation of ultraviolet rays, cathode rays, X-rays, vacuum ultraviolet rays, or the like. Therefore, these phosphors are useful for various applications, for example, such as fluorescent lamp, cathode ray tube, X-ray image converter and plasma display device, and some of them have been practically used. Needless to say, it is desirable that the luminance of these phosphors is to be as high as possible from the viewpoint of practical use thereof. Accordingly, it is desired to obtain a cerium activated or cerium and terbium activated oxide phosphor which emits light of higher luminance than the above-mentioned conventional cerium activated or cerium and terbium activated oxide phosphors.

SUMMARY OF THE INVENTION

Therefore, an object of the present invention is to provide a cerium activated or cerium and terbium activated oxide phosphor which emits blue to green light of higher luminance than the conventional cerium activated or cerium and terbium activated oxide phosphors.

In order to accomplish the above object, the inventors of the present invention searched for the oxide host material suitable to be activated with cerium or cerium and terbium. As a result of the search, it was found that when the borate host material comprising the following (i) and (ii), or (i), (ii) and (iii) contained in a proper molar ratio was activated with a proper amount of cerium or cerium and terbium, the phosphor which emits blue to green light of high luminance under excitation of ultraviolet rays, cathode rays, X-rays, vacuum ultraviolet rays, or the like, and particularly emits blue to green light of higher luminance than the conventional cerium activated or cerium and terbium activated oxide phosphor under excitation of ultraviolet rays or vacuum ultraviolet rays could be obtained.

(i) $B_2O_3$ (ii) $M^{II}O$ wherein $M^{II}$ is at least one divalent metal selected from the group consisting of magnesium, beryllium, zinc, cadmium, calcium, strontium and barium (iii) at least one oxide selected from the group consisting of (a) $M^{IV}O_2$ wherein $M^{IV}$ is at least one tetravalent element selected from the group consisting of silicon, titanium, germanium, zirconium, tin, thorium and lead, (b) $M^V_2O_5$ wherein $M^V$ is at least one pentavalent element selected from the group consisting of phosphorus, vanadium, niobium, antimony, tantalum and arsenic, (c) $M^I_2O$ wherein $M^I$ is at least one alkali metal selected from the group consisting of lithium, sodium, potassium, rubidium and cesium, (d) $M^{III}_2O_3$ wherein $M^{III}$ is at least one trivalent metal selected from the group consisting of aluminum, scandium, gallium, yttrium, indium, lanthanum, lutecium, gadolinium, bismuth and thallium, and (e) $M^{VI}O_3$ wherein $M^{VI}$ is at least one hexavalent metal selected from the group consisting of molybdenum, tellurium and tungsten.

The phosphor of the present invention is a cerium activated or cerium and terbium activated borate phosphor represented by the formula

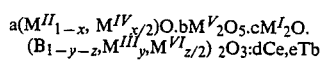

$$a(M^{II}_{1-x}, M^{IV}_{x/2})O \cdot bM^V_2O_5 \cdot cM^I_2O \cdot (B_{1-y-z}, M^{III}_y, M^{VI}_{z/2})_2O_3 : dCe, eTb$$

wherein $M^{II}$ is at least one divalent metal selected from the group consisting of magnesium, beryllium, zinc, cadmium, calcium, strontium and barium; $M^{IV}$ is at least one tetravalent element selected from the group consisting of silicon, titanium, germanium, zirconium, tin, thorium and lead; $M^V$ is at least one pentavalent element selected from the group consisting of phosphorus, vanadium, niobium, antimony, tantalum and arsenic; $M^I$ is at least one alkali metal selected from the group consisting of lithium, sodium, potassium, rubidium and cesium; $M^{III}$ is at least one trivalent metal selected from the group consisting of aluminum, scandium, ga-lium, yttrium, indium, lanthanum, lutecium, gadolinium, bismuth and thallium; $M^{VI}$ is at least one hexavalent metal selected from the group consisting of molybdenum, tellurium and tungsten; and a, b, c, d, e, x, y and z are numbers satisfying the conditions of $0 < a \leq 2.0$, $0 \leq b \leq 0.3$, $0 \leq c \leq 0.3$, $0 < d \leq 0.6$, $0 \leq e \leq 0.6$, $0 \leq x \leq 0.6$, $0 \leq y \leq 0.35$ and $0 \leq z \leq 0.01$, respectively. From the viewpoint of the luminance of light emitted by the phosphor, the numbers a, b, c, d, e, x, y and z should preferably satisfy the conditions of $0.07 \leq a \leq 1.5$, $0 \leq b \leq 0.2$, $0 \leq c \leq 0.2$, $0.005 \leq d \leq 0.3$, $0.0001 \leq e \leq 0.3$, $0 \leq x \leq 0.4$, $0 \leq y \leq 0.2$ and $0 \leq z \leq 0.005$, respectively.

The phosphor of the present invention emits blue to green light of high luminance under excitation of ultraviolet rays, cathode rays, X-rays, vacuum ultraviolet rays, or the like. Particularly, under excitation of ultraviolet rays or vacuum ultraviolet rays, the phosphor of the present invention emits blue to green light of higher luminance than the conventional cerium activated or cerium and terbium activated oxide phosphors.

As one kind of phosphors having borate host material, the phosphor represented by the following formula has been known in the art (see Japanese Patent Public Disclosure No. 3,915/1974);

$$MgO.\alpha B_2O_3:\beta A$$

wherein A is terbium and/or dysprosium, and $\alpha$ and $\beta$ are numbers satisfying the conditions of $0.2 \leq \alpha \leq 5.0$ and $10^{-5} \leq \beta \leq 0.05$, respectively. The phosphor has the same host material as the phosphor of the present invention wherein $b=0$, $c=0$, $x=0$, $y=0$ and $z=0$. In the phosphor, however, the host material is activated with terbium and/or dysprosium differently from the phosphor of the present invention in which the host material is activated with cerium or cerium and terbium. Further, the phosphor is a thermoluminescent phosphor having a remarkable thermoluminescent property which can be utilized in a thermoluminescent dosimeter, and only emits light of very low luminance under excitation of ultraviolet rays, cathode rays, X-rays, vacuum ultraviolet rays, or the like.

Further, as a cerium and terbium activated phosphor in which the host material contains $B_2O_3$, the above-mentioned $(Ce,Tb)_2O_3.3B_2O_3$ phosphor has been known in the art (see Japanese Patent Laid Open No. 33,986/1978). However, differently from the phosphor of the present invention in which the host material is a complex oxide comprising at least divalent metal oxide and $B_2O_3$, the host material of the $(Ce,Tb)_2O_3.3B_2O_3$ phosphor consists solely of $B_2O_3$. Moreover, as described below, the phosphor of the present invention emits light of markedly high luminance than the $(Ce,Tb)_2O_3.3B_2O_3$ phosphor.

DETAILED DESCRIPTION OF THE INVENTION

Figure 1:
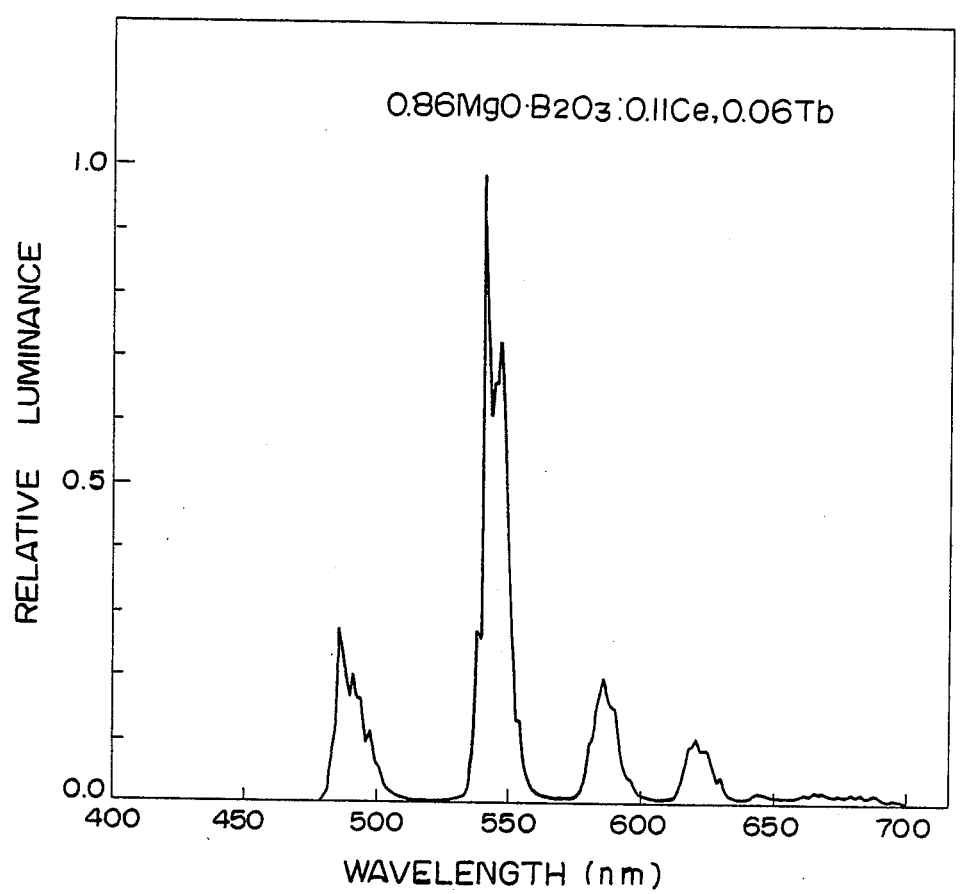
FIGS. 1 and 2 are graphs showing emission spectra of the 0.86 $MgO.B_2O_3:0.11Ce,0.06Tb$ phosphor and the 0.33 $MgO0.05Li_2O.B_2O_30.11Ce,0.06Tb$ phosphor of the present invention, respectively.

The present invention will hereinbelow be described in detail.

The phosphor of the present invention represented by the above formula is prepared by the following process.

The following raw materials are used;

(i) at least one compound selected from the group consisting of boron oxide ($B_2O_3$) and boron compounds which are easily alterable to $B_2O_3$ at a high temperature such as boric acid ($H_3BO_3$), metaboric acid ($HBO_2$), ammonium borate [$(NH_4)_3BO_3$], and the like, (ii) at least one compound selected from the group consisting of (a) the first subgroup consisting of magnesium oxide (MgO), beryllium oxide (BeO), zinc oxide (ZnO), cadmium oxide (CdO), calcium oxide (CaO), strontium oxide (SrO) and barium oxide (BaO), and (b) the second subgroup consisting of magnesium compounds, beryllium compounds, zinc compounds, cadmium compounds, calcium compounds, strontium compounds and barium compounds which are easily alterable to the above-mentioned respective oxides at a high temperature such as nitrate, carbonate, sulfate, hydroxide, halide, and the like, (iii) at least one compound selected from the group consisting of (a) the first subgroup consisting of silicon dioxide ($SiO_2$), titanium dioxide ($TiO_2$), germanium dioxide ($GeO_2$), zirconium dioxide ($ZrO_2$), tin dioxide ($SnO_2$), thorium dioxide ($ThO_2$) and lead dioxide ($PbO_2$), and (b) the second subgroup consisting of silicon compounds, titanium compounds, germanium compounds, zirconium compounds, tin compounds, thorium compounds and lead compounds which are easily alterable to the above-mentioned respective oxides at a high temperature such as nitrate, sulfate, hydroxide, halide, and the like, (iv) at least one compounds selected from the group consisting of (a) the first subgroup consisting of phosphorus pentoxide ($P_2O_5$), vanadium pentoxide ($V_2O_5$), niobium pentoxide ($Nb_2O_5$), antimony pentoxide ($Sb_2O_5$), tantalum pentoxide ($Ta_2O_5$) and arsenic pentoxide ($As_2O_5$), and (b) the second subgroup consisting of phosphorus compounds, vanadium compounds, niobium compounds, antimony compounds, tantalum compounds and arsenic compounds which are easily alterable to the above-mentioned respective oxides at a high temperature, (v) at least one compound selected from the group consisting of (a) the first subgroup consisting of lithium oxide ($Li_2O$), sodium oxide ($Na_2O$), potassium oxide ($K_2O$), rubidium oxide ($Rb_2O$) and cesium oxide ($Cs_2O$), and (b) the second subgroup consisting of lithium compounds, sodium compounds, potassium compounds, rubidium compounds and cesium compounds which are easily alterable to the above-mentioned respective oxides at a high temperature such as nitrate, carbonate, sulfate, hydroxide, halide, and the like, (vi) at least one compound selected from the group consisting of (a) the first subgroup consisting of aluminum oxide ($Al_2O_3$), scandium oxide ($Sc_2O_3$), gallium oxide ($Ga_2O_3$), yttrium oxide ($Y_2O_3$), indium oxide ($In_2O_3$), lanthanum oxide ($La_2O_3$), lutecium oxide ($Lu_2O_3$), gadolinium oxide ($Gd_2O_3$), bismuth oxide ($Bi_2O_3$) and thallium oxide ($Tl_2O_3$), and (b) the second subgroup consisting of aluminum compounds, scandium compounds, gallium compounds, yttrium compounds, indium compounds, lanthanum compounds, lutecium compounds, gadolinium compounds, bismuth compounds and thallium compounds which are easily alterable to the above-mentioned respective oxides at a high temperature such as nitrate, carbonate, sulfate, hydroxide, halide, and the like, (vii) at least one compound selected from the group consisting of (a) the first subgroup consisting of molybdenum trioxide ($MoO_3$), tellurium trioxide ($TeO_3$) and tungsten trioxide ($WO_3$), and (b) the second subgroup consisting of molybdenum compounds, tellurium compounds and tungsten compounds which are easily alterable to the above-mentioned respective oxides at a high temperature, (viii) at least one compound selected from the group consisting of cerium dioxide ($CeO_2$) and cerium compounds which are easily alterable to oxide at a high temperature such as nitrate, carbonate, sulfate, halide, and the like, and (ix) at least one compound selected from the group consisting of terbium peroxide ($Tb_4O_7$) and terbium compounds which are easily alterable to oxide at a high temperature such as nitrate, carbonate, sulfate, halide, and the like.

The above-mentioned raw materials (i) to (ix) are weighed out in such a ratio that a raw material mixture stoichiometrically represented by the following formula is obtained, and mixed well;

$$a(M^{II}_{1-x}M^{IV}_{x/2})O \cdot bM^{V}_2O_5 \cdot cM^{I}_2O \cdot (B_{1-y-z}M^{III}_{y}M^{VI}_{z/2})_2O_3:dCe,eTb$$

wherein $M^{II}$ is at least one divalent metal selected from the group consisting of magnesium, beryllium, zinc, cadmium, calcium, strontium and barium; $M^{IV}$ is at least one tetravalent element selected from the group consisting of silicon, titanium, germanium, zirconium, tin, thorium and lead; $M^{V}$ is at least one pentavalent element selected from the group consisting of phosphorus, vanadium, niobium, antimony, tantalum and arsenic; $M^{I}$ is at least one alkali metal selected from the group consisting of lithium, sodium, potassium, rubidium and cesium; $M^{III}$ is at least one trivalent metal selected from the group consisting of aluminum, scandium, gallium, yttrium, indium, lanthanum, lutecium, gadolinium, bismuth and thallium; $M^{VI}$ is at least one hexavalent metal selected from the group consisting of molybdenum, tellurium and tungsten; and a, b, c, d, e, x, y and z are numbers satisfying the conditions of $0 < a \leq 2.0$, $0 \leq b \leq 0.3$, $0 \leq c \leq 0.3$, $0 < d \leq 0.6$, $0 \leq e \leq 0.6$, $0 \leq x \leq 0.6$, $0 \leq y \leq 0.35$ and $0 \leq z \leq 0.01$, respectively.

Particularly, from the viewpoint of the luminance of light emitted by the phosphor obtained, the numbers a, b, c, d, e, x, y and z should preferably satisfy the conditions of $0.07 \leq a \leq 1.5$, $0 \leq b \leq 0.2$, $0 \leq c \leq 0.2$, $0.005 \leq d \leq 0.3$, $0.0001 \leq e \leq 0.3$, $0 \leq x \leq 0.4$, $0 \leq y \leq 0.2$ and $0 \leq z \leq 0.005$, respectively. The raw materials may be mechanically mixed by means of a ball mill, a mixer mill, a mortar, or the like (dry process), or may be mixed in pasty condition using a liquid medium such as a water, an acid, and the like (wet process). In preparation of phosphor, a flux is often added to a raw material mixture to improve the properties of the phosphor obtained such as luminance of emission; size, size distribution and shape of phosphor particles; and so forth. In the preparation of the phosphor of the present invention, the luminance of light emitted by the phosphor can be improved by adding a proper amount of flux to the raw material mixture. As the flux, ammonium chloride ($NH_4Cl$), ammonium fluoride ($NH_4F$), ammonium hydrogen fluoride ($NH_4HF_2$), ammonium bromide ($NH_4Br$), ammonium iodide ($NH_4I$), ammonium carbonate [$(NH_4)_2CO_3$], ammonium nitrate ($NH_4NO_3$), etc. can be used. It is needless to say that when $b=0$, $c=0$, $e=0$, $x=0$, $y=0$ or $z=0$, the raw material (iv), (v), (ix), (iii), (vi) or (vii) is not used, respectively.

Then, the raw material mixture is put into a heatresistant container such as an alumina crucible, a quartz crucible, or the like and fired in an electric furnace. The firing is performed once or more than once in the air, an inert atmosphere such as an argon gas atmosphere or a nitrogen gas atmosphere, or a reducing atmosphere such as a nitrogen gas atmosphere containing a small amount of hydrogen gas or a carbon vapor atmosphere. The firing temperature is within the range of 800° to 1100° C. In the firing step, at least the final firing (in the case of single firing, the firing itself) is preferably performed in an inert atmosphere or a reducing atmosphere in order to surely make the valence of the activators cerium and terbium trivalent. Although the firing period is determined depending on the amount of the raw material mixture put into the heat-resistant container, the firing temperature employed and so forth, the firing period is generally within the range of 0.5 to 6 hours, preferably 1 to 5 hours.

Before the above-mentioned firing, the raw material mixture put into the heat-resistant container is preferably prefired in order to alter the raw materials to oxides and enhance the reactivity of the raw materials during the firing. The prefiring is generally performed once or more than once in the air at a temperature with in the range of about 400° to 800° C. The prefiring period is generally within the range of 0.5 to 6 hours.

After the firing, the fired product obtained is subjected to the processes generally employed in the production of phosphor, such as pulverizing, washing, drying, sieving and so forth to obtain the phosphor of the present invention.

By the above-mentioned process, the cerium activated (in the case wherein e is zero) or cerium and terbium activated (in the case wherein e is $0 < e \leq 0.6$) borate phosphor of the present invention represented by the following formula can be obtained;

$$a(M^{II}_{1-x}M^{IV}_{x/2})O \cdot bM^{V}_2O_5 \cdot cM^{I}_2O \cdot (B_{1-y-z}M^{III}_{y}M^{VI}_{z/2})_2O_3:dCe,eTb$$

ps wherein $M^{I}$, $M^{II}$, $M^{III}$, $M^{IV}$, $M^{V}$, $M^{VI}$, a, b, c, d, e, x, y and z have the same definition as described above. The phosphor emits blue to green light of high luminance under excitation of ultraviolet rays, cathode rays, x-rays, vacuum ultraviolet rays, or the like. That is, when the amount of terbium (value e) is zero, the phosphor exibits blue light emission caused by cerium. However, when the value e is not zero, the green light emission caused by terbium is gradually enhanced as the value e increases. Generally, when the value e is not less than about $10^{-4}$, the phosphor emits green light though the color of light emitted thereby also depends on the amount of cerium (value d).

Figure 2:
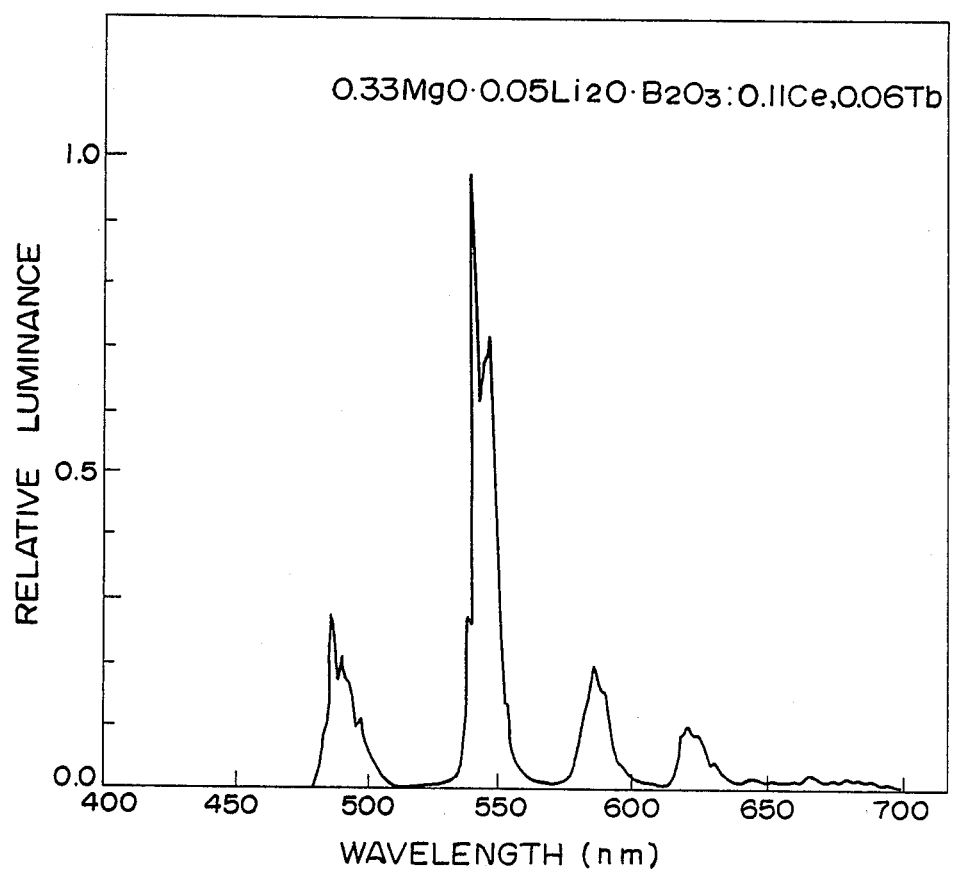

As described above, the color of light emitted by the phosphor of the present invention essentially depends on the amount of terbium (value e) relative to the amount of cerium (value d). Accordingly, even though the kind of $M^{I}$, $M^{II}$, $M^{III}$, $M^{IV}$, $M^{V}$ or $M^{VI}$, or the value a, b, c, x, y or z changes, the color of light emitted by the phosphor does not essentially change. The emission spectra of the $0.86MgO \cdot B_2O_3 : 0.11Ce, 0.06Tb$ phosphor and the $0.33MgO \cdot 0.05Li_2O \cdot B_2O_3 : 0.11Ce, 0.06Tb$ phosphor of the present invention are shown in FIGS. 1 and 2, respectively. As is clear from the comparison of FIGS. 1 and 2, these phosphors have almost the same emission spectrum, because they are activated with the same amount of cerium and terbium.

Table 1 below shows the luminance of emission of the cerium and terbium activated borate phosphor of the present invention (Nos. 2 to 46) under excitation of ultraviolet rays of 253.7 nm in comparison with that of the cerium and terbium activated boron oxide phosphor (No. 1) disclosed in the above-mentioned Japanese Patent Laid Open No. 33,986/1978. In Table 1, the luminance of emission is represented by a relative value with reference to that of the conventional $(Ce,Tb)_2O_3 \cdot 3B_2O_3$ phosphor defined to be 100.

Further, by further activating the phosphor of the present invention with a proper amount of activator such as praseodymium (Pr), neodymium (Nd), samarium (Sm), europium (Eu), dysprosium (Dy), holmium (Ho), erbium (Er), ytterbium (Yb), thulium (Tm), etc., the phosphor which emits light of high luminance can be obtained.

TABLE 1

| No. | Formula of the Phosphor | Relative Luminance of Emission |
|---|---|---|
| 1 | $(Ce_{0.65},Tb_{0.35})_2O_3 \cdot 3B_2O_3$ | 100 |
| 2 | $0.33MgO \cdot B_2O_3 : 0.11Ce, 0.06Tb$ | 191 |
| 3 | $0.86MgO \cdot B_2O_3 : 0.11Ce, 0.17Tb$ | 188 |
| 4 | $0.71BeO \cdot B_2O_3 : 0.11Ce, 0.17Tb$ | 185 |
| 5 | $0.5ZnO \cdot B_2O_3 : 0.06Ce, 0.06Tb$ | 163 |
| 6 | $0.64MgO \cdot B_2O_3 : 0.06Ce, 0.29Tb$ | 130 |
| 7 | $0.29(Mg_{0.7},Zn_{0.3})O \cdot B_2O_3 : 0.11Ce, 0.06Tb$ | 187 |
| 8 | $0.33MgO \cdot B_2O_3 \cdot 0.05Li_2O : 0.11Ce, 0.06Tb$ | 213 |
| 9 | $0.33MgO \cdot B_2O_3 \cdot 0.05Na_2O : 0.11Ce, 0.06Tb$ | 210 |
| 10 | $0.33MgO \cdot B_2O_3 \cdot 0.05K_2O : 0.11Ce, 0.06Tb$ | 208 |
| 11 | $0.33MgO \cdot B_2O_3 \cdot 0.05Rb_2O : 0.11Ce, 0.06Tb$ | 203 |
| 12 | $0.33MgO \cdot B_2O_3 \cdot 0.05Cs_2O : 0.11Ce, 0.06Tb$ | 201 |
| 13 | $0.86MgO \cdot (B_{0.9},Al_{0.1})_2O_3 : 0.11Ce, 0.17Tb$ | 211 |
| 14 | $0.86MgO \cdot (B_{0.9},Sc_{0.1})_2O_3 : 0.11Ce, 0.17Tb$ | 192 |
| 15 | $0.86MgO \cdot (B_{0.9},Ga_{0.1})_2O_3 : 0.11Ce, 0.17Tb$ | 212 |
| 16 | $0.86MgO \cdot (B_{0.9},Y_{0.1})_2O_3 : 0.11Ce, 0.17Tb$ | 196 |
| 17 | $0.86MgO \cdot (B_{0.9},In_{0.1})_2O_3 : 0.11Ce, 0.17Tb$ | 188 |
| 18 | $0.86MgO \cdot (B_{0.9},La_{0.1})_2O_3 : 0.11Ce, 0.17Tb$ | 201 |
| 19 | $0.86MgO \cdot (B_{0.9},Lu_{0.1})_2O_3 : 0.11Ce, 0.17Tb$ | 195 |
| 20 | $0.86MgO \cdot (B_{0.9},Gd_{0.1})_2O_3 : 0.11Ce, 0.17Tb$ | 202 |
| 21 | $0.86MgO \cdot (B_{0.9},Tl_{0.1})_2O_3 : 0.11Ce, 0.17Tb$ | 211 |
| 22 | $0.86MgO \cdot (B_{0.95},Bi_{0.05})_2O_3 : 0.11Ce, 0.17Tb$ | 106 |
| 23 | $0.86MgO \cdot 0.02Li_2O \cdot (B_{0.9},Al_{0.1})_2O_3 : 0.11Ce, 0.17Tb$ | 215 |
| 24 | $0.71(Be_{0.8},Si_{0.1})O \cdot B_2O_3 : 0.11Ce, 0.17Tb$ | 192 |
| 25 | $0.71(Be_{0.9},Ti_{0.05})O \cdot B_2O_3 : 0.11Ce, 0.17Tb$ | 117 |
| 26 | $0.71(Be_{0.9},Ge_{0.05})O \cdot B_2O_3 : 0.11Ce, 0.17Tb$ | 128 |
| 27 | $0.71(Be_{0.9},Zr_{0.05})O \cdot B_2O_3 : 0.11Ce, 0.17Tb$ | 151 |
| 28 | $0.71(Be_{0.9},Sn_{0.05})O \cdot B_2O_3 : 0.11Ce, 0.17Tb$ | 102 |
| 29 | $0.71(Be_{0.9},Th_{0.05})O \cdot B_2O_3 : 0.11Ce, 0.17Tb$ | 105 |
| 30 | $0.71(Be_{0.9},Pb_{0.05})O \cdot B_2O_3 : 0.11Ce, 0.17Tb$ | 109 |
| 31 | $0.71(Be_{0.9},Si_{0.05})O \cdot 0.02Na_2O \cdot (B_{0.95},Ga_{0.05})_2O_3 : 0.11Ce, 0.17Tb$ | 203 |
| 32 | $0.5ZnO \cdot 0.1P_2O_5 \cdot B_2O_3 : 0.06Ce, 0.06Tb$ | 172 |
| 33 | $0.5ZnO \cdot 0.01V_2O_5 \cdot B_2O_3 : 0.06Ce, 0.06Tb$ | 101 |
| 34 | $0.5ZnO \cdot 0.01Nb_2O_5 \cdot B_2O_3 : 0.06Ce, 0.06Tb$ | 124 |
| 35 | $0.5ZnO \cdot 0.01Sb_2O_5 \cdot B_2O_3 : 0.06Ce, 0.06Tb$ | 107 |
| 36 | $0.5ZnO \cdot 0.01Ta_2O_5 \cdot B_2O_3 : 0.06Ce, 0.06Tb$ | 135 |
| 37 | $0.5ZnO \cdot 0.01As_2O_5 \cdot B_2O_3 : 0.06Ce, 0.06Tb$ | 111 |
| 38 | $0.5(Zn_{0.9},Si_{0.05})O \cdot 0.05P_2O_5 \cdot 0.02K_2O \cdot (B_{0.95},Tl_{0.05})_2O_3 : 0.06Ce, 0.06Tb$ | 184 |
| 39 | $0.64MgO \cdot (B_{0.996},Mo_{0.002})_2O_3 : 0.06Ce, 0.29Tb$ | 105 |
| 40 | $0.64MgO \cdot (B_{0.996},Te_{0.002})_2O_3 : 0.06Ce, 0.29Tb$ | 102 |
| 41 | $0.64MgO \cdot (B_{0.996},W_{0.002})_2O_3 : 0.06Ce, 0.29Tb$ | 101 |
| 42 | $0.29(Mg_{0.7},Zn_{0.3})O \cdot 0.05Na_2O \cdot (B_{0.9},Y_{0.1})_2O_3 : 0.11Ce, 0.06Tb$ | 196 |
| 43 | $0.29(Mg_{0.8},Cd_{0.2})O \cdot 0.01Rb_2O \cdot (B_{0.9},Gd_{0.1})_2O_3 : 0.11Ce, 0.06Tb$ | 194 |
| 44 | $0.29(Mg_{0.9},Ba_{0.1})O \cdot 0.01Cs_2O \cdot (B_{0.9},La_{0.1})_2O_3 : 0.11Ce, 0.06Tb$ | 191 |
| 45 | $0.29(Mg_{0.9},Ca_{0.1})O \cdot 0.01K_2O \cdot (B_{0.9},Lu_{0.1})_2O_3 : 0.11Ce, 0.06Tb$ | 181 |
| 46 | $0.29(Mg_{0.9},Sr_{0.1})O \cdot 0.01Li_2O \cdot (B_{0.9},Sc_{0.1})_2O_3 : 0.11Ce, 0.06Tb$ | 180 |

As is clear from Table 1, the phosphor of the present invention emits light of higher luminance than the conventional $(Ce,Tb)_2O_3 \cdot 3B_2O_3$ phosphor. In the phosphor of the present invention, the phosphor containing $M^I{}_2O$ (Nos. 8 to 12), the phosphor containing $M^{III}{}_2O_3$ wherein $M^{III}$ is at least one of the above-mentioned trivalent metals other than bismuth (Nos. 13 to 21), the phosphor containing $SiO_2$ (No. 24) and the phosphor containing $P_2O_5$ (No 32) emit light of higher luminance than the phosphors which do not contain the above-mentioned respective constituents (Nos. 2, 3, 4 and 5, respectively). Partitularly, the phosphor containing $M^I{}_2O$ and $M^{III}{}_2O_3$ wherein $M^{III}$ is at least one of the above-mentioned trivalent metals other than bismuth (for example, No. 23) emits light of remarkably high luminance. From the viewpoint of luminance of emission, $M^{II}$ should preferably be at least one divalent metal selected from the group consisting of magnesium, beryllium, zinc and cadmium.

Since the phosphor of the present invention emits blue to green light of high luminance under excitation of ultraviolet rays, cathode rays, X-rays, vacuum ultraviolet rays, or the like, the phosphor can be utilized in fluorescent lamp, cathode ray tube, X-ray image converter, plasma display device, etc. As examplified in Table 1, under excitation of ultraviolet rays, the phosphor of the present invention emits light of higher luminance than the conventional cerium activated or cerium and terbium activated oxide phosphors. Further, under excitation of vacuum ultraviolet rays, the phosphor of the present invention also emits light of higher luminance than the conventional cerium activated or cerium and terbium activated oxide phosphor. For example, under the excitation of vacuum ultraviolet rays of 147 nm, the $0.86MgO \cdot B_2O_3 : 0.11Ce, 0.06Tb$ phosphor and the $0.33MgO \cdot 0.05Li_2O \cdot B_2O_3 : 0.11Ce, 0.06Tb$ phosphor of the present invention exhibited the luminance of emission of more than 20 times and more than 22 times as high as that of the conventional $(Ce_{0.65},Tb_{0.35})_2O_3 \cdot 3B_2O_3$ phosphor, respectively.

The present invention will hereinbelow be described referring to several examples.

EXAMPLE 1

| Magnesium nitrate | $Mg(NO_3)_2 \cdot 6H_2O$ | 32.2 grams |
|---|---|---|
| Magnesium chloride | $MgCl_2 \cdot 6H_2O$ | 5.1 grams |
| Boron oxide | $B_2O_3$ | 12.2 grams |
| Cerium nitrate | $Ce(NO_3)_3 \cdot 6H_2O$ | 8.4 grams |
| Terbium peroxide | $Tb_4O_7$ | 2.0 grams |
| Ammonium chloride | $NH_4Cl$ | 5.3 grams |

The above terbium peroxide was dissolved in nitric acid to obtain a solution, and the other raw materials and the flux were added to the solution and mixed thoroughly therein to obtain a pasty mixture. Then, the pasty mixture was dried, pulverized, put into an alumina crucible and prefired in an electric furnace. The prefiring was performed at a temperature of 500° C. for 2 hours in the air. After the prefiring, the fired product obtained was pulverized, put into the alumina crucible and subjected to second prefiring in the electric furnace. The second prefiring was performed under the same conditions as the first prefiring. After the second prefiring, the fired product obtained was pulverized, put into the alumina crucible and fired in the electric furnace. The firing was performed at a temperature of 1050° C. for 2 hours in a carbon vapor atmosphere. After the firing, the fired product was pulverized, washed with water, dried and sieved. Thus, $0.86MgO \cdot B_2O_3:0.11Ce,0.06Tb$ phosphor was obtained.

The phosphor emitted green light of high luminance under excitation of ultraviolet rays, cathode rays, X-rays, vacuum ultraviolet rays, or the like. The emission spectrum of the phosphor is shown in FIG. 1. The luminance of emission of the phosphor was about 1.9 times as high as that of the $(Ce_{0.65},Tb_{0.35})_2O_3 \cdot 3B_2O_3$ phosphor disclosed in the above-mentioned Japanese Patent Laid Open No. 33,986/1978 under excitation of ultraviolet rays of 253.7 nm.

EXAMPLE 2

| Magnesium nitrate | $Mg(NO_3)_2 \cdot 6H_2O$ | 14.8 grams |
|---|---|---|
| Boron oxide | $B_2O_3$ | 12.2 grams |
| Cerium nitrate | $Ce(NO_3)_3 \cdot 6H_2O$ | 8.4 grams |
| Terbium peroxide | $Tb_4O_7$ | 5.6 grams |

Employing the above raw materials, $0.33MgO \cdot B_2O_3:0.11Ce,0.17Tb$ phosphor was prepared in the same manner as described in Example 1.

The phosphor emitted green light of high luminance under excitation of ultraviolet rays, cathode rays, X-rays, vacuum ultraviolet rays, or the like. The luminance of emission of the phosphor was about 1.9 times as high as that of the conventional $(Ce_{0.65},Tb_{0.35})_2O_3 \cdot 3B_2O_3$ phosphor under excitation of ultraviolet rays of 253.7 nm.

EXAMPLE 3

| Beryllium oxide | BeO | 3.1 grams |
|---|---|---|
| Boron oxide | $B_2O_3$ | 12.2 grams |
| Terbium peroxide | $Tb_4O_7$ | 5.6 grams |
| Cerium nitrate | $Ce(NO_3)_3 \cdot 6H_2O$ | 8.4 grams |
| Ammonium chloride | $NH_4Cl$ | 5.3 grams |

Employing the above raw materials and the flux, $0.71BeO \cdot B_2O_3:0.11Ce,0.17Tb$ phosphor was prepared in the same manner as described in Example 1 except for performing the firing at a temperature of 950° C.

The phosphor emitted green light of high luminance under excitation of ultraviolet rays, cathode rays, X-rays, vacuum ultraviolet rays, or the like. The luminance of emission of the phosphor was about 1.5 times as high as that of the conventional $(Ce_{0.65},Tb_{0.35})_2O_3 \cdot 3B_2O_3$ phosphor under excitation of ultraviolet rays of 253.7 nm.

EXAMPLE 4

| Zinc nitrate | $Zn(NO_3)_2 \cdot 6H_2O$ | 26.0 grams |
|---|---|---|
| Boron oxide | $B_2O_3$ | 12.2 grams |
| Cerium nitrate | $Ce(NO_3)_3 \cdot 6H_2O$ | 4.6 grams |
| Terbium peroxide | $Tb_4O_7$ | 2.0 grams |

Employing the above raw materials, $0.5ZnO \cdot B_2O_3:0.06Ce,0.06Tb$ phosphor was prepared in the same manner as described in Example 1 except for performing the firing at a temperature of 900° C.

The phosphor emitted green light of high luminance under excitation of ultraviolet rays, cathode rays, X-rays, vacuum ultraviolet rays, or the like. The luminance of emission of the phosphor was about 1.6 times as high as that of the conventional $(Ce_{0.65},Tb_{0.35})_2O_3 \cdot 3B_2O_3$ phosphor under excitation of ultraviolet rays of 253.7 nm.

EXAMPLE 5

| Magnesium nitrate | $Mg(NO_3)_2 \cdot 6H_2O$ | 23.9 grams |
|---|---|---|
| Magnesium fluoride | $MgF_2$ | 1.2 grams |
| Boron oxide | $B_2O_3$ | 12.2 grams |
| Cerium nitrate | $Ce(NO_3)_3 \cdot 6H_2O$ | 4.6 grams |
| Terbium peroxide | $Tb_4O_7$ | 9.5 grams |
| Ammonium fluoride | $NH_4F$ | 3.7 grams |

Employing the above raw materials and the flux, $0.64MgO \cdot B_2O_3:0.06Ce,0.29Tb$ phosphor was prepared in the same manner as described in Example 1.

The phosphor emitted green light of high luminance under excitation of ultraviolet rays, cathode rays, X-rays, vacuum ultraviolet rays, or the like. The luminance of emission of the phosphor was about 1.3 times as high as that of the conventional $(Ce_{0.65},Tb_{0.35})_2O_3 \cdot 3B_2O_3$ phosphor under excitation of ultraviolet rays of 253.7 nm.

EXAMPLE 6

| Magnesium nitrate | $Mg(NO_3)_2 \cdot 6H_2O$ | 9.1 grams |
|---|---|---|
| Zinc nitrate | $Zn(NO_3)_2 \cdot 6H_2O$ | 4.5 grams |
| Boron oxide | $B_2O_3$ | 12.2 grams |
| Cerium nitrate | $Ce(NO_3)_3 \cdot 6H_2O$ | 8.4 grams |
| Terbium peroxide | $Tb_4O_7$ | 2.0 grams |

Employing the above raw materials, $0.29(Mg_{0.7}, Zn_{0.3})O \cdot B_2O_3:0.11Ce,0.06Tb$ phosphor was prepared in the same manner as described in Example 1.

The phosphor emitted green light of high luminance under excitation of ultraviolet rays, cathode rays, X- rays, vacuum ultraviolet rays, or the like. The luminance of emission of the phosphor was about 1.9 times as high as that of the conventional $(Ce_{0.65},Tb_{0.35})_2O_3.3B_2O_3$ phosphor under excitation of ultraviolet rays of 253.7 nm.

EXAMPLE 7

| Magnesium nitrate | $Mg(NO_3)_2.6H_2O$ | 14.8 grams |
| --- | --- | --- |
| Boron oxide | $B_2O_3$ | 12.2 grams |
| Lithium nitrate | $LiNO_3$ | 1.2 grams |
| Cerium nitrate | $Ce(NO_3)_3.6H_2O$ | 8.4 grams |
| Terbium peroxide | $Tb_4O_7$ | 2.0 grams |

Employing the above raw materials, $0.33MgO.0.05Li_2O.B_2O_3:0.11Ce,0.06Tb$ phosphor was prepared in the same manner as described in Example 1.

The phosphor emitted green light of high luminance under excitation of ultraviolet rays, cathode rays, X-rays, vacuum ultraviolet rays, or the like. The emission spectrum of the phosphor is shown in FIG. 2. The luminance of emission of the phosphor was about 2.1 times as high as that of the conventional $(Ce_{0.65},Tb_{0.35})_2O_3.3B_2O_3$ phosphor under excitation of ultraviolet rays of 253.7 nm.

EXAMPLE 8

| Magnesium nitrate | $Mg(NO_3)_2.6H_2O$ | 32.2 grams |
| --- | --- | --- |
| Magnesium chloride | $MgCl_2.6H_2O$ | 5.1 grams |
| Boron oxide | $B_2O_3$ | 11.0 grams |
| Aluminum nitrate | $Al(NO_3)_3.9H_2O$ | 13.1 grams |
| Cerium nitrate | $Ce(NO_3)_3.6H_2O$ | 8.4 grams |
| Terbium peroxide | $Tb_4O_7$ | 5.6 grams |
| Ammonium chloride | $NH_4Cl$ | 5.3 grams |

Employing the above raw materials and the flux, $0.86MgO.(B_{0.9},Al_{0.1})_2O_3:0.11Ce,0.17Tb$ phosphor was prepared in the same manner as described in Example 1.

The phosphor emitted green light of high luminance under excitation of ultraviolet rays, cathode rays, X-rays, vacuum ultraviolet rays, or the like. The luminance of emission of the phosphor was about 2.1 times as high as that of the conventional $(Ce_{0.65},Tb_{0.35})_2O_3.3B_2O_3$ phosphor under excitation of ultraviolet rays of 253.7 nm.

EXAMPLE 9

| Beryllium oxide | BeO | 2.5 grams |
| --- | --- | --- |
| Boron oxide | $B_2O_3$ | 12.2 grams |
| Silicon dioxide | $SiO_2$ | 0.8 grams |
| Terbium peroxide | $Tb_4O_7$ | 5.6 grams |
| Cerium nitrate | $Ce(NO_3)_3.6H_2O$ | 8.4 grams |
| Ammonium chloride | $NH_4Cl$ | 5.3 grams |

Employing the above raw materials and the flux, $0.71(Be_{0.8},Si_{0.1})O.B_2O_3:0.11Ce,0.17Tb$ phosphor was prepared in the same manner as described in Example 1 except for performing the firing at a temperature of 950° C.

The phosphor emitted green light of high luminance under excitation of ultraviolet rays, cathode rays, X-rays, vacuum ultraviolet rays, or the like. The luminance of emission of the phosphor was about 1.9 times as high as that of the conventional $(Ce_{0.65},Tb_{0.35})_2O_3.3B_2O_3$ phosphor under excitation of ultraviolet rays of 253.7 nm.

EXAMPLE 10

| Zinc nitrate | $Zn(NO_3)_2.6H_2O$ | 26.0 grams |
| --- | --- | --- |
| Boron oxide | $B_2O_3$ | 12.2 grams |
| Orthophosphoric acid | $H_3PO_4$ | 3.4 grams |
| Cerium nitrate | $Ce(NO_3)_3.6H_2O$ | 4.6 grams |
| Terbium peroxide | $Tb_4O_7$ | 2.0 grams |

Employing the above raw materials, $0.5ZnO.0.1P_2O_5.B_2O_3:0.06Ce,0.06Tb$ phosphor was prepared in the same manner as described in Example 1 except for performing the firing at a temperature of 900° C.

The phosphor emitted green light of high luminance under excitation of ultraviolet rays, cathode rays, X-rays, vacuum ultraviolet rays, or the like. The luminance of emission of the phosphor was about 1.7 times as high as that of the conventional $(Ce_{0.65},Tb_{0.35})_2O_3.3B_2O_3$ phosphor under excitation of ultraviolet rays of 253.7 nm.

EXAMPLE 11

| Magnesium nitrate | $Mg(NO_3)_2.6H_2O$ | 23.9 grams |
| --- | --- | --- |
| Magnesium fluoride | $MgF_2$ | 1.2 grams |
| Baron oxide | $B_2O_3$ | 12.1 grams |
| Molybdenum trioxide | $MoO_3$ | 0.1 grams |
| Cerium nitrate | $Ce(NO_3)_3.6H_2O$ | 4.6 grams |
| Terbium peroxide | $Tb_4O_7$ | 9.5 grams |
| Ammonium fluoride | $NH_4F$ | 3.7 grams |

Employing the above materials and the flux, $0.64MgO.(B_{0.996},Mo_{0.002})_2O_3:0.06Ce,0.29Tb$ phosphor was prepared in the same manner as described in Example 1.

The phosphor emitted green light of high luminance under excitation of ultraviolet rays, cathode rays, X-rays, vacuum ultraviolet rays, or the like. The luminance of emission of the phosphor was about 1.1 times as high as that of the conventional $(Ce_{0.65},Tb_{0.35})_2O_3.3B_2O_3$ phosphor under excitation of ultraviolet rays of 253.7 nm.

EXAMPLE 12

| Magnesium nitrate | $Mg(NO_3)_2.6H_2O$ | 9.1 grams |
| --- | --- | --- |
| Zinc nitrate | $Zn(NO_3)_2.6H_2O$ | 4.5 grams |
| Boron oxide | $B_2O_3$ | 11.0 grams |
| Sodium fluoride | NaF | 0.7 grams |
| Yttrium oxide | $Y_2O_3$ | 4.0 grams |
| Cerium nitrate | $Ce(NO_3)_3.6H_2O$ | 8.4 grams |
| Terbium peroxide | $Tb_4O_7$ | 2.0 grams |

Employing the above raw materials, $0.29(Mg_{0.7},Zn_{0.3})O.0.05Na_2O.(B_{0.9},Y_{0.1})_2O_3:0.11Ce,0.06Tb$ phosphor was prepared in the same manner as described in Example 1.

The phosphor emitted green light of high luminance under excitation of ultraviolet rays, cathode rays, X-rays, vacuum ultraviolet rays, or the like. The luminance of emission of the phosphor was about twice as high as that of the conventional $(Ce_{0.65},Tb_{0.35})_2O_3.3B_2O_3$ phosphor under excitation of ultraviolet rays of 253.7 nm.

We claim:

1. A borate phosphor represented by the formula $aM^{II}O.B_2O_3:dCe,eTb$ wherein $M^{II}$ is at least one divalent metal selected from the group consisting of magnesium, beryllium, zinc, cadmium, calcium, strontium and barium; and a, d and e are numbers satisfying the conditions of $0<a\leqq 2.0$, $0<d\leqq 0.6$ and $0<e\leqq 0.6$, respectively.

2. A borate phosphor as defined in claim 1 wherein said a is a number satisfying the conditions of $0.07\leqq a\leqq 1.5$.

3. A borate phosphor as defined in claim 1 wherein said d and e are numbers satisfying the conditions of $0.005\leqq d\leqq 0.3$ and $0.0001\leqq e\leqq 0.3$, respectively.

* * * * *